United States Patent [19]
Huang et al.

[11] Patent Number: 6,001,540
[45] Date of Patent: Dec. 14, 1999

[54] MICROLENS PROCESS

[75] Inventors: Ji-Chung Huang, Hsin-Chu; Yea-Dean Sheu, Hsinchu; Chung-En Hsu, Hsin-Chu; Han-Liang Tseng, Hsinchu, all of Taiwan

[73] Assignee: Taiwan Semiconductor Manufacturing Company, Ltd., Hsin-Chu, Taiwan

[21] Appl. No.: 09/089,556

[22] Filed: Jun. 3, 1998

[51] Int. Cl.$^6$ ............................... G03F 7/00; G02B 3/00
[52] U.S. Cl. .............................. 430/321; 430/313; 216/2; 216/26
[58] Field of Search .................... 430/321, 313; 216/2, 26

[56] References Cited

U.S. PATENT DOCUMENTS

| | | | |
|---|---|---|---|
| 5,118,924 | 6/1992 | Mehra et al. | 250/211 |
| 5,574,293 | 11/1996 | Arai et al. | 257/59 |
| 5,871,653 | 2/1999 | Ling | 216/2 |

OTHER PUBLICATIONS

Sakakibara et al, "A1format 1.5M pixel IT–CCD image sensor for a HDTV camera system" IEEE Trans on Consumer Electronics, vol. 37, No. 3, Aug. 1991, p. 487–493.
Sano et al, "Submicron Spaced Lens Array Process Technology For A High Photosensitivity CCD Image Sensor", IEDM, 1990, p283–6.
Furukawa et al, "A 1/3 inch 38 OK pixil IT CCD image sensor", IEEE Trans on Consumer Electronics, vol. 38, No. 3, Aug. 1992, p595,600.
Deguchi et al. "Microlens Design Using Simulation Program For CCD Image Sensor" IEEE Transactions on Consumer Electronics, vol. 38, No. 3, Aug. 1992, p583–589.
Tsukamato et al, "High Sensitivity Pixel Technology for a 1/4 inch PAL 43 OK pixel IT–CCD", pub 1996 Custom IC Conf. p39–40.

*Primary Examiner*—John A. McPherson
*Assistant Examiner*—Nicole Barreca
*Attorney, Agent, or Firm*—George O. Saile; Stephen B. Ackerman

[57] ABSTRACT

A process is described for forming a microlens, either directly on a substrate or as part of a process to manufacture an optical imaging array. The process starts with the deposition of a layer of silicon oxide over the substrate, said layer being the determinant of the lens to substrate distance. This is followed by layers of polysilicon and silicon nitride. The latter is patterned to form a mask which protects the poly, except for a small circular opening, during its oxidation (under the same conditions as used for LOCOS). The oxide body that is formed is lens shaped, extending above the poly surface by about the same amount as below it, and just contacting the oxide layer. After the silicon nitride and all poly have been removed, the result is a biconvex microlens. In a second embodiment, a coating of SOG is provided that has a thickness equal to half the microlens thickness, thereby converting the latter to a plano-convex lens.

20 Claims, 2 Drawing Sheets

MICROLENS PROCESS

FIELD OF THE INVENTION

The invention relates to the general field of CCD based imaging arrays with particular reference to their use of microlenses.

BACKGROUND OF THE INVENTION

Microlenses are in widespread use in conjunction with light imaging arrays, particularly when these utilize photodiodes operating together with charge coupled devices (CCDs). The purpose of the microlens is to focus a pixel's worth of light onto the photodiode, thereby increasing the sensitivity of the display.

The easiest, and most commonly used, way to form a microlens has been to first form a disk of resin (which in practice is also a photoresist) and then to heat it until it softens, allowing surface tension forces to give it a hemisperical shape which approximates a plano-convex lens.

This process, while easy to use, is often difficult to control, making the future optical behavior of the microlens difficult to predict. Additionally, once the microlens has been formed the array must not be subjected to temperatures in excess of about 200° C. or the microlens will melt. Such temperatures could be of external origin or they could be the result of lens heating. Finally, the optical transparency of photoresist tends to decrease over time, particularly when it is repeatedly exposed to light. Aside from decreasing the overall sensitivity of the array, this also serves to exacerbate the lens heating problem mentioned above.

The present invention provides a method of fabricating a microlens from silicon oxide, which material is much more robust than photoresist with respect to both temperature and light. In the course of searching for prior art we did not find that this method has been previously described. The following references were, however, found to be of interest:

Use of photoresist to form microlenses is discussed in detail by Sakakibara et al. in 'A 1" format 1.5M pixel IT-CCD image sensor for a HDTV camera system' published in the IEEE Transactions on Consumer Electronics vol. 37 no. 3 August 1991, pp. 487–493. A similar discussion may be found in 'Submicron spaced lens array process technology for a high photosensitivity CCD image sensor' by Sano et al. in IEDM 1990 pp. 283–286.

Furukawa et al. discuss the design of microlenses and the associated system in 'A ⅓ inch 380K pixel IT-CCD image sensor' in the IEEE Transactions on Consumer Electronics vol. 38 no. 3 August 1992, pp. 595–600. The design of microlenses is also discussed by Deguchi et al. in 'Microlens design using simulation program for CCD image sensor' in IEEE Transactions on Consumer Electronics vol. 38 no. 3 August 1992 pp. 583–589.

A non photoresist microlens, formed by reflowing a disk of boro-phosphosilicate glass (BPSG) at high temperature is described by Tsukamato et al. in 'High sensitivity pixel technology for a ¼ inch PAL 430K pixel IT-CCD' published in the 1996 Custom IC Conference, pp. 39–42.

We note here that all the above references describe processes that result in plano-convex lenses. Additionally, these processes do not, in general, provide for control of the distance between the microlens and the photodiode as an independent variable. Rather, this distance is determined by other parameters of the total process which must be compromised if said distance needs to be modified.

SUMMARY OF THE INVENTION

It has been an object of the present invention to provide a process for manufacturing a microlens that is stable at high temperature and/or after extensive exposure to light.

Another object of the invention has been that, at user's option, said process provide either a biconvex or a plano-convex microlens.

A still further object has been that the distance between the microlens and the substrate (or a point therein) be independently adjustable.

Yet another object has been that said process be fully compatible with the manufacture of optical imaging systems, particularly CCD based imaging systems.

These objects have been achieved by depositing a layer of silicon oxide over the substrate, said layer being the determinant of the lens to substrate distance. This is followed by layers of polysilicon and silicon nitride. The latter is patterned to form a mask which protects the poly, except for a small circular opening, during the oxidation of the poly (using the same parameters as in LOCOS). The oxide body that is formed is lens shaped, extending above the poly surface by about the same amount as below it, and just touching the oxide layer. After the silicon nitride and all poly have been removed, the result is a biconvex microlens. In a second embodiment, a coating of SOG is provided that has a thickness equal to half the microlens thickness, thereby converting the latter to a plano-convex lens.

DESCRIPTION OF THE PREFERRED EMBODIMENTS

The process of the present invention, to be described below, is presented in the context of a CCD based imaging array because this is where most widespread application of the invention is anticipated. The process is, however, quite general in nature and could be used to form a microlens on any substrate.

Figure 1:
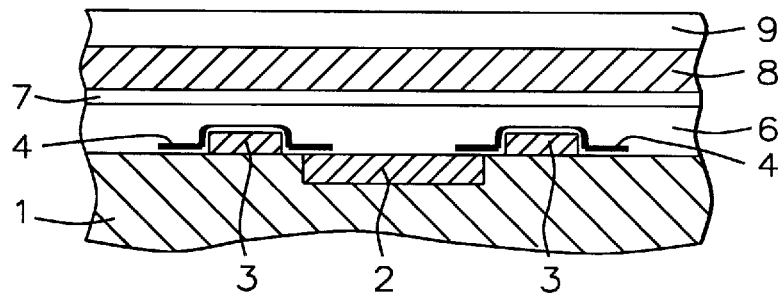
FIG. 1 is a schematic cross-section showing a partially completed imaging array, including a vertical charge coupled device, protected by a light shield, and a photodiode, on a silicon substrate, embedded within a planarized ILD layer, coated with layers of silicon oxide, polysilicon, and silicon nitride.

Referring now to FIG. 1, a schematic cross-section is shown of a partially completed integrated circuit intended for use in an imaging array. Photodiode 2 is seen embedded in silicon substrate 1. On either side of it are vertical CCDs 3 which are covered by light shields 4. The latter are formed from tungsten silicide, but other similar materials could also have been used. Their thickness is between about 500 and 2,000 Angstroms. These parts have been covered by a dielectric layer of BPTEOS or BPSG which serves as an Inter Level Dielectric (ILD) 6 for the IC. As shown, the top surface of the ILD has been planarized.

The process of the present invention begins with the deposition of silicon oxide layer 7, onto the top surface of ILD layer 6, to a thickness between about 0.1 and 10 microns. The actual thickness value used may vary on a case by case basis since it will determine how far the microlens is from the photodiode. This is an important feature of the present invention since, as already mentioned, many processes in current use do not allow this quantity to be independently controlled.

The next step is the deposition of polysilicon layer 8 onto the top surface of oxide layer 7. Layer 8 has a thickness between about 0.1 and 0.5 microns. The thickness of polysilicon used will determine the thickness of the microlens as well as its focal length (thinner lenses made by this process tending to have greater focal lengths.

The last step illustrated in FIG. 1 is silicon nitride layer 9 which has been deposited onto the top surface of layer 8 to a thickness between about 0.1 and 0.3 microns.

Figure 2:
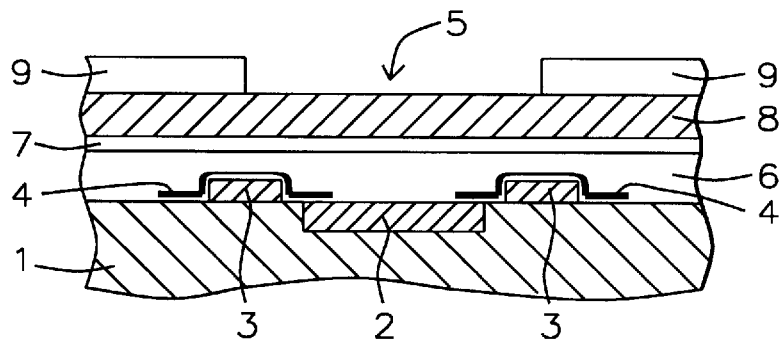
FIG. 2 illustrates the use of the silicon nitride layer as a mask during oxidation.

Referring now to FIG. 2, silicon nitride layer 9 has been patterned and etched (using standard photolithographic technology) so that circular opening 5 is formed, centered directly above photodiode 2. The diameter of 5 is between about 0.2 and 1 microns and may be varied depending on the desired depth of focus of the microlens.

The next step in the process is to oxidize polysilicon layer 8 wherever it is not protected by the silicon nitride 9. The conditions under which oxidation is performed are essentially the same as the standard Local Oxidation Of Silicon (LOCOS) method, namely heating at a pressure of about one atmosphere for between about 2–4 hours at a temperature between about 850 and 950° C.

Figure 3:
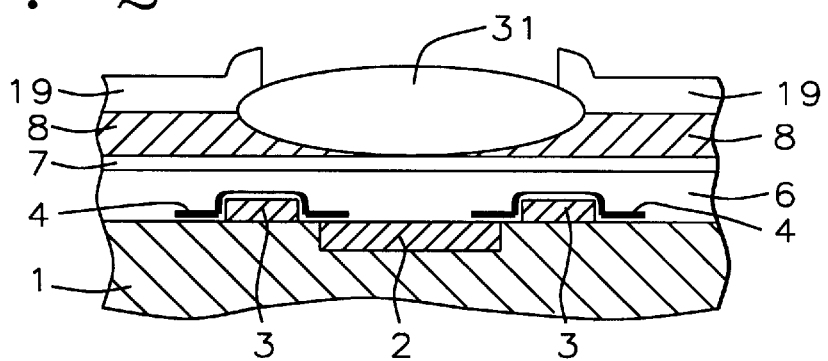
FIG. 3 illustrates the appearance of the unprotected portion of the polysilicon layer at the conclusion of oxidation.

As illustrated in FIG. 3, the LOCOS oxide 31 grows both into and away from the the polysilicon surface in approximately equal amounts (more precisely, about 55% above and about 45% below the surface). It also penetrates beneath the silicon nitride mask (now designated 19) causing it to be raised up at its edges. Because of this mode of growth, the oxide body 31 is approximately lenticular, or lens shaped (provided the diameter of opening 5 is within the limits that we have specified). The oxidation process is allowed to continue long enough for oxide body 31 to just make contact with oxide layer 7.

Figure 4:
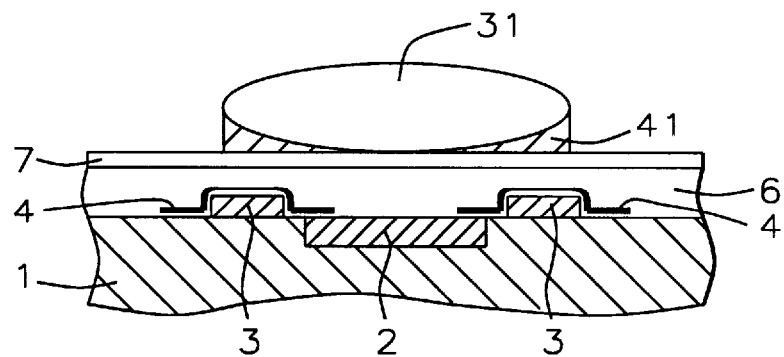
FIG. 4 shows the structure after all polysilicon, except a portion immediately beneath the microlens, has been removed.

Once the microlens has been formed, the silicon nitride layer 19 is removed, following which all polysilicon, other than the small amount 41 that lies directly beneath the lens, is removed using a dry (reactive ion) etch consisting of a mixture of chlorine and hydrogen bromide, at a power level between about 270 and 325 watts (with 300 watts being preferred), at a pressure between about 300 and 400 mtorr (with 350 mtorr being preferred), for between about 25 to 35 seconds (with 31 seconds being optimum for 1,500 Angstroms of polysilicon). The appearance of the structure at this stage is illustrated in FIG. 4.

Figure 5:
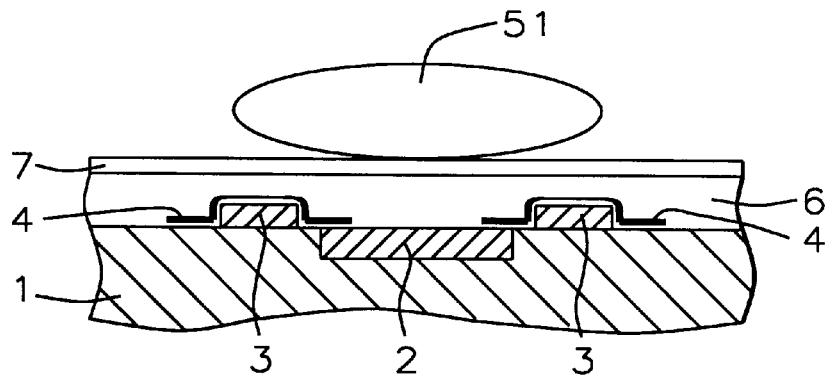
FIG. 5 shows how the structure, after all polysilicon has been removed, is a biconvex microlens.

Removal of the remaining polysilicon 41 is then effected using a wet etch composed of hydrogen fluoride:nitric acid:water in the proportions 1:50:20 followed by a rinse in deionized water, giving the completed structure the appearance illustrated in FIG. 5. Note the appearance of biconvex lens 51 which is attached to oxide layer 7 over a small area at its base.

Figure 6:
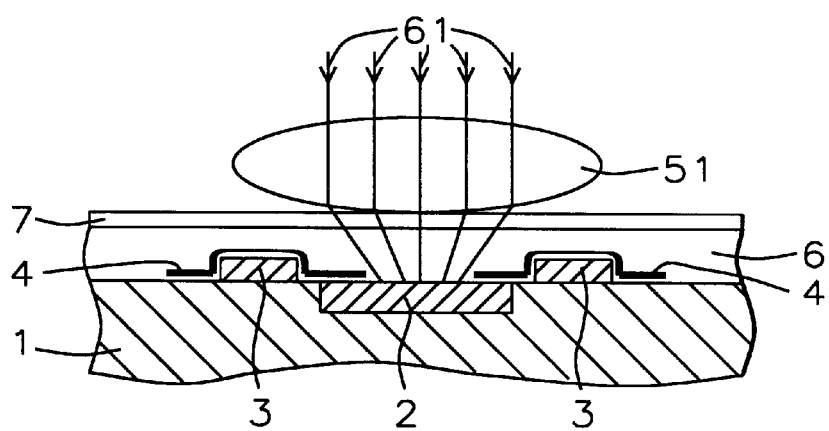
FIG. 6 illustrates how a microlens, formed according to the process of the present invention, focusses light rays.
Figure 7:
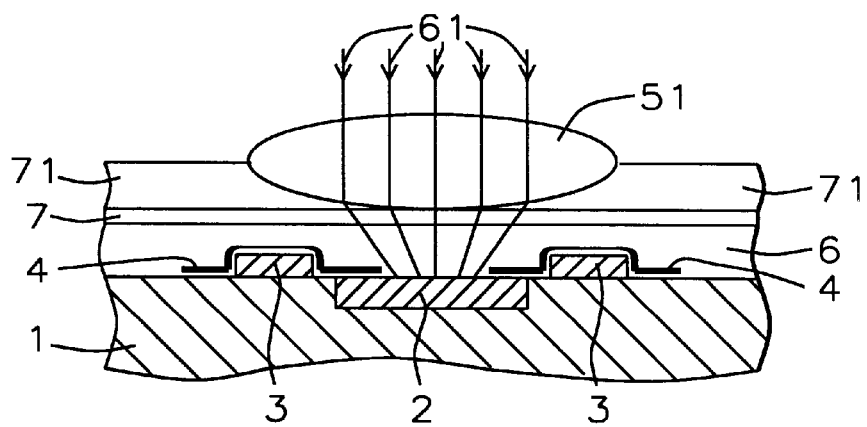
FIG. 7 shows a second embodiment wherein the structure becomes a plano-convex microlens.

The optical behavior of microlens 51 is illustrated in FIG. 6 which shows incoming light rays 61 being brought to a focus by microlens 51. In this example, the focal point for rays 61 will be close to the boundary between photodiode 2 and silicon substrate 1, but this could be readily adjusted (if need be) by changing the thickness of layer 7.

In a second embodiment of the present invention, an additional step of coating the structure with a layer of spin on glass (SOG) 71 is added to the process. The thickness of the SOG is carefully controlled so that, after drying and firing, its thickness is equal to half the thickness of the biconvex lens 51. Provided the refractive indices of the SOG layer and that of the microlens 51 are within about 90% of one another, the amount of reflection and refraction that takes place at the SOG to silicon oxide interface is negligible and the resulting assemblage acts as a plano-convex lens. To meet these conditions we have found the silicate based SOGs and the siloxane based SOGs to be suitable.

While the invention has been particularly shown and described with reference to the preferred embodiments thereof, it will be understood by those skilled in the art that various changes in form and details may be made without departing from the spirit and scope of the invention.

What is claimed is:

1. A method of forming a microlens, comprising:

providing a substrate;

depositing a layer of silicon oxide onto said substrate;

depositing a layer of polysilicon onto said layer of silicon oxide;

depositing a layer of silicon nitride onto said layer of polysilicon;

patterning and etching the silicon nitride layer to form therein a circular opening;

oxidizing the polysilicon that is not covered by silicon nitride whereby a lenticular body of silicon oxide, having a thickness sufficient to bring said lenticular body into contact with said silicon oxide layer, is formed;

removing the silicon nitride;

using a first etching procedure, removing all polysilicon that does not underlie the lenticular body; and using a second etching procedure, removing all remaining polysilicon, thereby forming a microlens.

2. The method of claim 1 wherein the layer of silicon oxide is deposited to a thickness between about 0.1 and 10 microns, thereby controlling how far the microlens is from the substrate.

3. The method of claim 1 wherein the layer of polysilicon is deposited to a thickness between about 0.1 and 0.5 microns.

4. The method of claim 1 wherein the step of oxidizing the polysilicon further comprises heating at about one atmosphere for between about 2–4 hours at a temperature between about 850 and 950° C.

5. The method of claim 1 further comprising:

coating the layer of silicon oxide with a layer of spin on glass to a thickness equal to half said lenticular body's thickness; and drying and firing the spin on glass.

6. A process for manufacturing a biconvex microlens, comprising:

providing a partially completed imaging array including a vertical charge coupled device, protected by a light shield, and a photodiode, on a silicon substrate, embedded within a planarized ILD layer;

depositing a first layer of silicon oxide onto said ILD layer;

depositing a layer of polysilicon onto said first layer of silicon oxide;

depositing a layer of silicon nitride onto said layer of polysilicon;

patterning and etching the silicon nitride layer to form therein a circular opening located directly above the photodiode;

oxidizing the polysilicon that is not covered by silicon nitride whereby a lenticular body of silicon oxide, having a thickness sufficient to bring said lenticular body into contact with said first silicon oxide layer, is formed;

removing the silicon nitride;

using a first etching procedure, removing all polysilicon that does not underlie the lenticular body; and using a second etching procedure, removing all remaining polysilicon, thereby forming a biconvex microlens.

7. The process of claim 6 wherein the first layer of silicon oxide is deposited to a thickness between about 0.1 and 10 microns, thereby controlling how far the biconvex microlens is from the photodiode.

8. The process of claim 6 wherein the layer of polysilicon is deposited to a thickness between about 0.1 and 0.5 microns.

9. The process of claim 6 wherein the step of oxidizing the polysilicon further comprises heating at about one atmosphere for between about 2–4 hours at a temperature between about 850 and 950° C.

10. The process of claim 6 wherein said first etching procedure further comprises using a dry etch of a mixture of chlorine and hydrogen bromide, at a power level between about 270 and 325 watts, at a pressure between about 300 and 400 mtorr, for between about 25 to 35 seconds.

11. The process of claim 6 wherein said second etching procedure further comprises using a wet etch composed of hydrogen fluoride:nitric acid:water in proportions 1:50:20, respectively, followed by a rinse in deionized water.

12. The process of claim 6 wherein the circular opening has a diameter that is between about 0.2 and 1 microns.

13. The process of claim 6 wherein the light shield is tungsten silicide.

14. A process for manufacturing a plano-convex microlens, comprising:

providing a partially completed imaging array including a vertical charge coupled device, protected by a light shield, and a photodiode, on a silicon substrate, embedded within a planarized ILD layer;

depositing a first layer of silicon oxide onto said ILD layer;

depositing a layer of polysilicon onto said first layer of silicon oxide;

depositing a layer of silicon nitride onto said layer of polysilicon;

patterning and etching the silicon nitride layer to form therein a circular opening located directly above the photodiode;

oxidizing the polysilicon that is not covered by silicon nitride whereby a lenticular body of silicon oxide, having a thickness sufficient to bring said lenticular body into contact with said first silicon oxide layer, is formed;

removing the silicon nitride;

using a first etching procedure, removing all polysilicon that does not underlie the lenticular body;

using a second etching procedure, removing all remaining polysilicon;

coating the first layer of silicon oxide with a layer of spin on glass to a thickness equal to half said lenticular body's thickness; and drying and firing the spin on glass, thereby forming a plano-convex microlens.

15. The process of claim 14 wherein the first layer of silicon oxide is deposited to a thickness between about 0.1 and 10 microns, thereby controlling how far the plano-convex microlens is from the photodiode.

16. The process of claim 14 wherein the layer of polysilicon is deposited to a thickness between about 0.1 and 0.5 microns.

17. The process of claim 14 wherein the step of oxidizing the polysilicon further comprises heating at about one atmosphere for between about 2–4 hours at a temperature between about 850 and 950° C.

18. The process of claim 14 wherein the circular opening has a diameter that is between about 0.2 and 1 microns.

19. The process of claim 14 wherein the first layer of silicon oxide and said spin on glass have refractive indices that are within about 90% of one another.

20. The process of claim 19 wherein the spin on glass is silicate based or siloxane based.

* * * * *